(12) United States Patent
Glöckler

(10) Patent No.: US 6,921,349 B2
(45) Date of Patent: Jul. 26, 2005

(54) TRANSMISSION ARRANGEMENT

(76) Inventor: Dieter Glöckler, Bergstrasse 34, 89081 Ulm (DE)

( * ) Notice: Subject to any disclaimer, the term of this patent is extended or adjusted under 35 U.S.C. 154(b) by 0 days.

(21) Appl. No.: 10/611,281

(22) Filed: Jun. 30, 2003

(65) Prior Publication Data

US 2004/0266578 A1 Dec. 30, 2004

(51) Int. Cl.$^7$ .......................... F16H 37/02; F16H 37/06; F16H 57/08
(52) U.S. Cl. ........................ 475/210; 475/211; 475/219; 475/330; 475/343
(58) Field of Search .............................. 475/208, 210, 475/211, 219, 330, 343

(56) References Cited

U.S. PATENT DOCUMENTS

| | | | | |
|---|---|---|---|---|
| 4,406,178 A | * | 9/1983 | Gillade | 475/211 |
| 4,467,669 A | | 8/1984 | Kawamoto | 74/688 |
| 4,599,916 A | * | 7/1986 | Hirosawa | 475/210 |
| 5,055,094 A | * | 10/1991 | Cataldo | 475/211 |
| 5,073,157 A | * | 12/1991 | Herscovici | 475/211 |
| 5,632,703 A | * | 5/1997 | Wilkes et al. | 475/211 |
| 5,766,105 A | * | 6/1998 | Fellows et al. | 474/18 |
| 5,890,987 A | * | 4/1999 | Lamers | 475/210 |
| 6,447,422 B1 | * | 9/2002 | Haka | 475/211 |
| 2003/0171183 A1 | * | 9/2003 | Den Besten | 475/210 |
| 2004/0023740 A1 | * | 2/2004 | Benassi et al. | 475/207 |

FOREIGN PATENT DOCUMENTS

| | | | | |
|---|---|---|---|---|
| DE | 4234747 A1 | * | 12/1993 | B60K/17/08 |
| DE | 32 02 591 | | 4/1994 | |
| DE | 19755612 A1 | * | 6/1999 | F16H/37/02 |
| DE | 199 20 063 | | 1/2001 | |
| EP | 0 308 078 | | 3/1989 | |
| JP | 02300550 A | * | 12/1990 | F16H/37/02 |

OTHER PUBLICATIONS

Gackstetter, Gunter: "Lesitungsverzweigung bei der stufenlosen Drehzahlregelung mit vierwelligen Planetengetrieben" VDI–Zeitschrift, 1966, Band 108, S. 210–214.

* cited by examiner

Primary Examiner—Tisha Lewis
(74) Attorney, Agent, or Firm—Baker & Daniels

(57) ABSTRACT

A gearbox unit having an input and output, first and second superposition gears designed as three-shaft planetary gears wherein the first shafts of the first superposition gears are connected against torsion with the input on the second shafts of the superposition gears are connected and secured against torsion with the gear output. A variable change-speed gear is arranged between the third shafts of the superposition gears and a mechanism provided for controlling the speed ratio thereof. The first and second planet wheels of one of the superposition gears mesh in pairs with each other and one of the wheels meshes with the ring gear. The second planet wheel meshes with the first planet wheel and with the sun gear. The other of the two superposition gears has individual planet wheels between the respective sun wheel and ring gear.

26 Claims, 6 Drawing Sheets

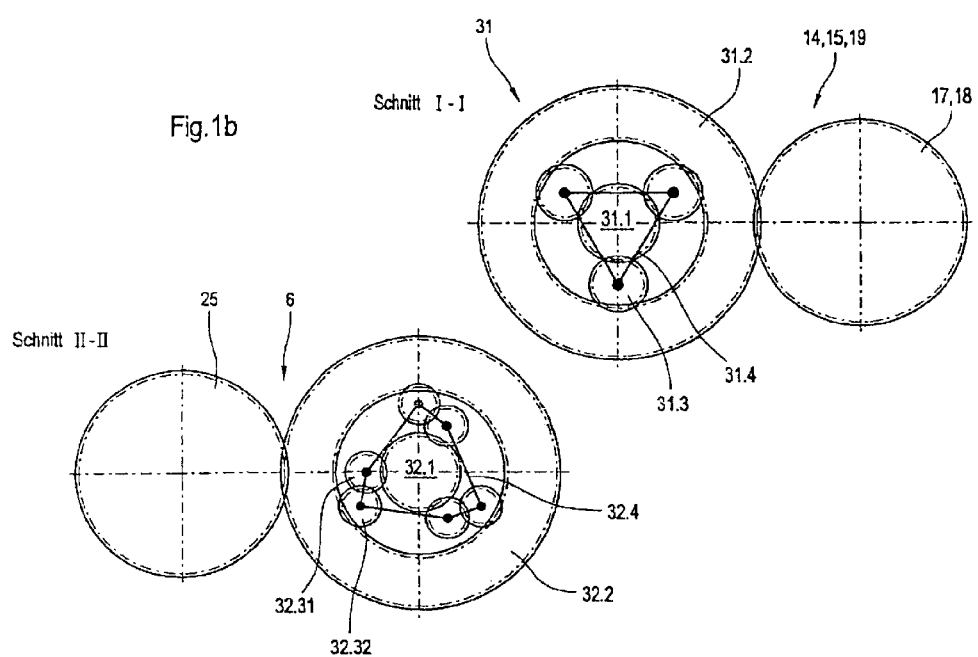

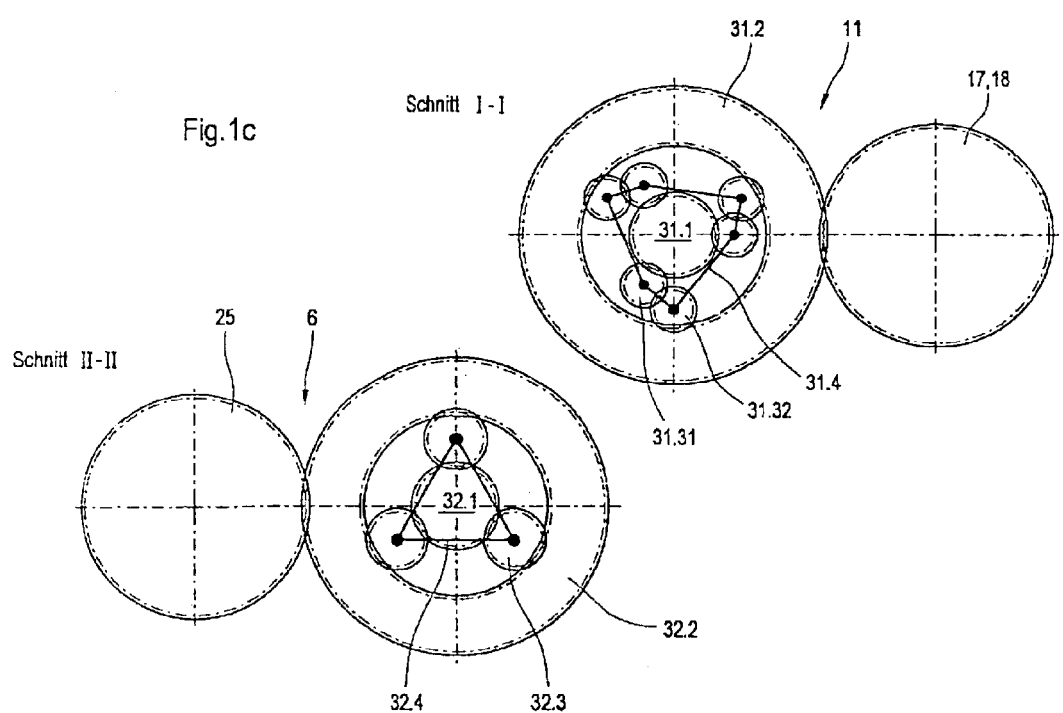

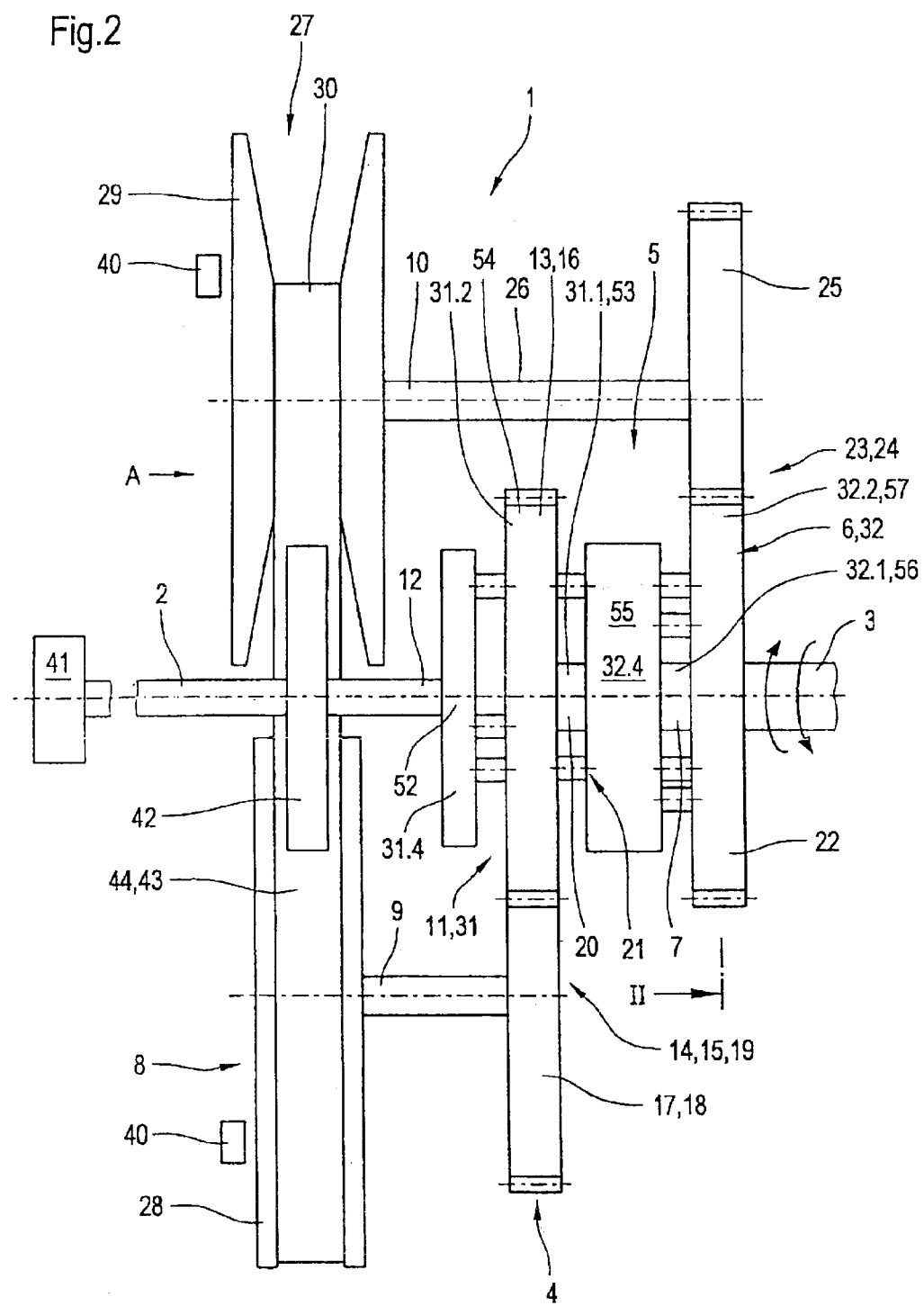

US 6,921,349 B2

TRANSMISSION ARRANGEMENT

BACKGROUND OF THE INVENTION

The invention relates to a gear configuration, in particular a superposition gear unit.

Gear configurations in the form of torque division gears or superposition gears are well known in a multiplicity of variations. DE 197 55 612 A1 discloses an apparatus that comprises a gear input shaft, an infinitely variable fixed ratio change-speed gear in form of a traction mechanism gear which is coupled with the gear input shaft and with the gear output shaft; said traction mechanism gear exhibits an input shaft and an output shaft, whereby the input shaft is connected secured against torsion with the gear input shaft, a fixed ratio stage as well as a superposition gear with a first input stage, which is connected secured against torsion with the output shaft of the infinitely variable fixed ratio change-speed gear. Furthermore a second input stage is provided, which can be connected through the fixed ratio stage with the gear input shaft by means of a first clutch and an output stage, which is coupled with the gear output shaft secured against torsion. Thereby the fixed ratio stage is coupled against torsion on the driving side with the gear input shaft and the first clutch arranged regarding the fixed ratio stage on the driven side in such a manner that it alternatively connects the second input stage of the superposition gear on the driven side with the fixed transmission.

With this solution it is possible to make in a simple and easy way a satisfactory multi-use gear available. This solution offers the advantage that at a multi-use gear, created by combining infinitely variable fixed ratio change-speed gear with a superposition gear, so-called Geared Neutral range high meshing speeds within the range of the first clutch are avoided, as this is arranged in a position after a appropriate ratio of the high number of revolutions of the drive shaft on the low number of revolutions (revolution speed) by the fixed ratio stage. This reduces wear and increases the lifetime of the first clutch. A substantial disadvantage exists however in the direct coupling between the infinitely variable change-speed gear, also called CVT, and the gear input and thus the drive shaft. The infinitely variable change-speed gear is thus always coupled to the number of revolutions of the drive engine. A relieving of the superposition gear within a range of higher numbers of revolutions of the drive shaft respectively lower speed ratios of the infinitely variable change-speed gear is thereby achieved in that a second clutch is provided, which connects alternatively the first input stage with the output stage of the superposition gears. Thus a rigid connection between the output shaft of the infinitely variable change-speed gear and the output shaft is created, whereby the superposition gear is spanned in the torque flow. This solution however is characterized by a high number of components and a high requirement for control, as the individual clutches have to be controlled in addition to the CVT. A further substantial problem of the power transfer through the infinitely variable change-speed gear is that due to the appropriate dimensioning only a maximum permissible torque can be transferred, otherwise inadmissible slip conditions can occur with very high loads, which lead to increased wear of the traction mechanism.

SUMMARY

It is therefore the task of the invention to further develop a gearbox unit of the kind initially mentioned in such a manner that this disadvantage is avoided. In particular the load of the traction mechanism gear is to be reduced and therefore the transferability of high power through this is to be ensured in an optimal way, whereby the solution to be developed is to be characterized by small constructional and control expenditure. Furthermore a gearbox unit is to be provided which is optimized regarding the number of different components and necessary space.

According to the design variation according to one form of the invention the gearbox unit is designed as a superposition gear unit. It comprises a gear input and a gear output, furthermore two superposition gears arranged between gear input and gear output and coupled with one another. Each of the two superposition gears is thereby designed as a three-shaft planetary gear. Both are coupled with one another to a four-shaft planetary gear. Furthermore an infinitely variable change-speed gear in form of a traction mechanism gear is connected in series between the first superposition gear and the second superposition gear. Each planetary gear comprises a sun wheel, a ring gear, planet wheels and a bar. The individual shafts are formed by the sun wheel, ring gear or bar of the respective superposition gear. The gear input is connected secured against torsion with a first shaft of the first superposition gear and a first shaft of the second superposition gear. The gear output is connected secured against torsion with a second shaft of the first superposition gear and a second shaft of the second superposition gear. The coupling of the two three-shaft planetary gears to a four-shaft planetary gear takes place via coupling of the first and second shafts of the first and second superposition gears. The arrangement of the infinitely variable change-speed gear in form of a traction mechanism gear takes place between the third shafts of the first and second superposition gear. The term shaft is thereby to be understood functionally, whereby either the individual elements of the planetary gears—sun wheel, ring gear or bar or the elements coupled secured against torsion with these, for example in the form of shafts or hollow shafts, are to be understood. The individual shafts assume the function of inputs and outputs, depending upon the operating state. Thus the first superposition gear comprises during power transfer from the gear input shaft to the gear output shaft through the infinitely variable change-speed gear one input and two outputs. The input is thereby formed by the first shaft, while the first output, which is at least indirectly connected with the infinitely variable change-speed gear, is formed by the third shaft and the second output, coupled secured against torsion with the gear output shaft, is formed by the second shaft. The second superposition gear comprises in this operating state an input and an output, whereby the input is likewise coupled with the gear input shaft and is formed by the first shaft of the second superposition gear and the output is formed by the second shaft. The third shaft is connected with the infinitely variable change-speed gear. Furthermore means are intended for changing the speed ratio at the gear. One of the two superposition gears according to the invention first or second superposition gear—exhibits planet wheels meshing in pairs with one another between the sun wheel and the ring gear. These run on bearings at the bar and can rotate. The planet wheels meshing in pairs with one another are also called double-rotor planet wheels. Due to the design of a second superposition gear with planet wheels meshing in pairs with one another, designed as planetary gears, which are also called double-rotor planetary gears, it is guaranteed at least for a portion of the entire operating range that the CVT operates with maximum peripheral speed, whereby also a change regarding the speed ratio at the individual disks at maximum engine speed can take place, i.e. turning over zero is possible and thus besides a Geared-Neutral also a change of direction of rotation can be realized with the gear according to the invention. The double-rotor design offers the advantage that an increase of the number of revolutions caused by this design at the output coupled with the infinitely variable change-speed gear, in particular ring gear of this planetary gear causes according to the design of the other planetary gear a decrease at the output, in particular the ring gear of the other planetary gear coupled with the infinitely variable change-speed gear.

According to a particularly favorable embodiment preferably in each case the sun wheels and the ring gears are dimensioned equally. This applies regarding their dimensions in the radial direction, in particular of the diameter, and regarding the gearing, in particular the number of teeth. One of the two superposition gears—first or second superposition gear provides the planet wheels meshing in pairs with one another at a point between the sun wheel and the ring gear. These run on bearings at the bar and can rotate. Thereby the first of the planet wheels meshes with the sun wheel and the second of the planet wheels meshes directly with the ring gear. The planet wheels of the other superposition gear result regarding their design due to the arrangement of sun wheel and ring gear in the case of the same design in both planet wheel sets. According to the allocation of the individual shafts as the first, second or third shaft the coupling with the infinitely variable change-speed gear takes place in form of the traction mechanism gear by means of connecting gears in the form of a transmission, for example in the form of spur wheel sets. These are preferably likewise dimensioned alike, i.e. equally. Furthermore means for changing the speed ratio are assigned to the infinitely variable change-speed gear, in particular the traction mechanism gear. If the planetary gears are designed with in each case equally dimensioned sun wheels and ring gears and the planet wheels in pairs 1 to 1 and identical spur wheels according to a particularly favorable embodiment it is guaranteed even in each operating state that the CVT works with constant number of revolutions, i.e. also maximum peripheral speed at maximum engine speed. This design offers besides the functional advantages also advantages regarding the necessary space, as the individual superposition gears are not different from each other in radial direction regarding the necessary space and furthermore the same elements can be used. The planet wheels meshing in pairs with one another can, depending upon the desired effect, be laid out preferably with a ratio of 1 to 1. However a ratio within the range of 1 to 0.9 to 1.2 is conceivable.

The ring gear and sun wheel of the two planet wheels can be of any design. However, the design is to be considered for the entire design, in particular concerning the connection between the outputs and the infinitely variable change-speed gear. For functional and structural reasons, therefore, an essentially identical dimensioning is preferred.

According to a particularly favorable design the first shafts of the two superposition gears are formed in each case by the bar of the individual superposition gear. The second shafts of the two superposition gears designed as planetary gears are formed in each case by the sun wheels of the individual planetary gears. The third shafts, which are at least indirectly coupled with the traction mechanism gear, are formed in each case by the ring gears. During power transfer through the infinitely variable change-speed gear regarded from the gear input to the gear output, the bar of the first superposition gear forms the input of the first superposition gear. The sun wheel then forms the first output, which is coupled with the gear output shaft, and the ring gear of the first superposition gear forms the second output.

The solution is characterized by the fact that no direct coupling secured against torsion exists between the gear input shaft and the infinitely variable change-speed gear, in particular the input of the infinitely variable change-speed gear, but that the coupling is realized by a superposition gear. Thus a constant speed ratio is obtained due to the coupling between superposition gear and infinitely variable change-speed gear over a stage. However the individual values—number of revolutions and torque—are always dependant on the conditions at the first superposition gear. During power transfer over the traction mechanism gear its size influences the number of revolutions at the gear output shaft, whereby this in return influences the first superposition gear and thereby the value of the power transferable through the first superposition gear and the number of revolutions of the third shaft of the first superposition gear. Thereby is achieved that unnecessarily high stresses of the infinitely variable change-speed gear are avoided at higher numbers of revolutions. The input of the infinitely variable change-speed gear is thus no longer coupled directly to the number of revolutions of the drive engine. Controlling the infinitely variable change-speed gear can change the number of revolutions at the gear output of the superposition gear unit.

Although the solution according to the invention uses a coupling structure known from the publication Gackstetter, G: "Torque division during the continuous speed controlling device with four-shaft planet wheel gears", VDI magazine, 1966, Volume 108, pages 210–214, the task cannot be solved by only using this coupling structure without double-rotor design of the planet wheels.

The coupling of the ring gear with the input of the infinitely variable change-speed gear takes place through a connecting gear in form of a transmission, for example a spur wheel set whereby this is formed by the ring gear and a spur wheel which is coupled secured against torsion with the input shaft of the infinitely variable change-speed gear. The first superposition gear functions in this condition as a power divider, while the second superposition gear functions as a summing gear when the gear output shaft is not at a standstill. The bar thereby likewise forms the input of the second superposition gear, while a further element in form of the ring gear is connected through a connecting gear preferably in form of a spur wheel set, with the output of the infinitely variable change-speed gear and functions in this operating state as an input. The sun wheel forms the output. Both superposition gears are thus coupled with one another, i.e. the sun wheels and the bars are connected secured against torsion with one another.

The infinitely variable change-speed gear can be designed in various shapes; it is preferably designed as a positively actuated traction mechanism gear. This comprises two disk arrangements, a first disk arrangement and a second disk arrangement, whereby the individual disks can be moved against each other for changing the speed ratio. Belts, chains and steel thrust belts are used as traction mechanisms.

The means for controlling the speed ratio comprise for the design of the traction mechanism gear two disk arrangements, whereby the distance of the disks of the disk arrangement is variable through the contact pressure of the disks of the disk arrangement and this value is used as a direct control value or an at least indirectly characterizing value. Adjusting units for the admission of the individual disks respectively for their movement can be operated for example electro hydraulically. An appropriate adjusting unit for the active change of the run radius for the traction mechanism can be assigned to either only one disk arrangement, whereby for example pre-tensioned spring mechanisms are assigned to the other disk arrangement, which make an automatic adjustment of the contact pressure and thus the adjustment of the run radius possible according to changing the distance of the individual disks and thus the run radius at the disk arrangement which can be actively controlled by means of the adjusting unit. Another possibility exists in controlling both disk arrangements. Concerning the specific design there are a multiplicity of possibilities already known state of the art, which are therefore not dealt with in more near detail.

The functional mode of a gear configuration is designed as follows:

During standstill of the gear output shaft, i.e. the drift of the entire gear unit, the conditions at the first superposition gear are designed as in a planetary gear with a second shaft in standstill, i.e. for the particularly favorable embodiment as with standing sun wheel. Accordingly a power transfer is performed by the first superposition gear and by means of the disk arrangement of the traction mechanism gear, which is coupled through a transmission with said superposition gear. This applies in analogy also to the second superposition gear, whose first shaft, i.e. in this case a bar, is coupled with the input in the gearbox unit. This means that in this condition both disk arrangements of the infinitely variable change-speed gear are driven. The first superposition gear functions thus as a power divider, whose input is coupled with the gear input shaft, whose first output is coupled with the traction mechanism gear and whose second output is coupled with the gear output shaft. The second superposition gear unit functions in this condition likewise as power divider, whereby the input is coupled with the gear input shaft and the first output is coupled with the gear output shaft and the second output is coupled with the second disk arrangement of the infinitely variable change-speed gear. In this functional state, for example, a ratio from 1 to 2 to 2.6, in particular 1 to 2.4, is selected as the speed ratio between the first disk arrangement and the second disk arrangement. This means that the second disk arrangement coupled with the second superposition gear rotates faster than the first disk arrangement, which is in a driven connection with the first superposition gear. The infinitely variable change-speed gear is in this condition running idle. Only if the speed ratio at the infinitely variable change-speed gear is changed, i.e. one changes from the ratio between first and second disk arrangement toward a ratio into the slow, i.e. from 1 to 2.4 to 2.4 to 1 (change of the disks in the number of revolutions) and thus a smaller torque is transferred by the first disk arrangement, is the power transfer then essentially performed by the first superposition gear on the traction mechanism gear, whereby the power fed through the variable change portion is supplied to the second superposition gear. In this case the second superposition gear functions as a summing gear with two inputs, which are formed by the first and the third shaft.

Due to the drive of the ring gear and the rotation of the bar the gear output shaft is driven accordingly. Since however the gear output shaft is also coupled directly with the first superposition gear, this affects in return the power portion, which is transferred by the infinitely variable change-speed gear and concretely the number of revolutions of the third shaft, in particular at the ring gear of the first superposition gear.

The design of the two superposition gears is made for example as follows:

1) Both ring gears and sun wheels have the same size. The first superposition gear has for example three individual planet wheels, the second superposition gear has a multiplicity of planet wheels in each case meshing in pairs with one another (for example 2 times 3 planet wheels), i.e. between sun wheel and ring gear are two planet wheels meshing with one another whereby the first planet wheel meshes directly with the sun wheel and the second planet wheel and the second planet wheel meshes directly with the first planet wheel and the ring gear. Both sun wheels, for the achievement of the speed ratio mentioned in the addressed range have for example a 2.4 times smaller number of teeth than the ring gear. In case of a desired turn over zero even more than 2.4 times smaller number of teeth are present.

2) Like 1), the first superposition gear has a multiplicity of planet wheels in each case meshing in pairs with one another, while the second superposition gear is characterized only by a simple planet wheel arrangement between sun wheel and ring gear.

The planet wheels meshing in pairs with one another are preferably designed identical, i.e. they preferably exhibit a ratio of 1 to 1. Other ratios are likewise conceivable.

The design of the intended ratio stages between first and second superposition gear and the variable transmission (CVT) takes place according to the maximum permissible number of revolutions at the CVT.

For the solution according to one form of the invention a control is planned additionally, which changes the speed ratio at the traction mechanism gear, in particular by changing the distances of the disks of a disk arrangement to each other. This takes place for example as a function of the engine speed, the desired number of revolutions at the gear output shaft being a function of the position of the gas pedal as well as further factors of influence. A multiplicity of possibilities exists concerning the control, whereby a conventional one can be chosen.

For the reversal of the direction of rotation a reversing gear mechanism or an appropriate arrangement can be provided, which make a reversal of the direction of rotation of the gear input shaft possible. Furthermore it is however also possible to fully utilize the spreading range and to drive the superposition gears over zero.

Furthermore a starting unit, for example in form of a hydrodynamic converter, a hydrodynamic clutch or a mechanical clutch, for example in form of a wet-running multiple disk clutch, can be assigned to the gearbox unit according to one form of the invention, in order to not transfer in the starting condition the full load to the infinitely variable change-speed gear.

With certain designs of the gear unit operation over zero is possible. Otherwise a reversing switch can be provided for the reversal of the direction of rotation.

According to a particularly favorable improvement it is possible to prevent resulting slip of the infinitely variable change-speed gear at high power by means of adjusting the peripheral speed at the traction mechanism to the number of revolutions of the drive shaft. Thus again an increase of the value of the transferable power can take place.

The means for adjusting the peripheral speed of the traction mechanism to the number of revolutions of the gear input comprises a transfer element, which is at least indirectly coupled with the gear input and can be brought into positively actuated connection with the traction mechanism. The traction mechanism is provided at the outer circumference with a rotating profiling, which is brought into mesh with a profiling at the outer circumference of the transfer element, which is designed complementary to it. Another possibility is to design the traction mechanism as a chain or a connection with a belt and a chain, whereby the transfer element is designed as a chain wheel, i.e. that the design takes place sequentially through unchanged positioning of the transfer element in relation to the traction mechanism. Adjustments of the traction mechanism with changes of the run radius during adjustment of the disks of the infinitely variable change-speed gear and synchronous adjustment of the peripheral speed of the traction mechanism to the number of revolutions of the gear input are compensated according to a first solution through a tensioning device; in particular a tightening roller. The tightening roller runs pivoted on a bearing in relation to the traction mechanism and is thereby stationary. The transfer element is thereby at least indirectly coupled with the gear input. This means that the transfer element is coupled either secured against torsion with the gear input or is coupled through further transfer elements with the gear input. In order to guarantee a rotation of the transfer element with same direction of rotation as the direction of travel of the traction mechanism it is either directly coupled secured against torsion with the drive shaft respectively the gear input or through further transfer elements for example a spur wheel set, whereby the number of transfer elements meshing with one another is then odd. The transfer elements can also be arranged pivoted in relation to the traction mechanism. They then serve at the same time as a tensioning device for the adjustment of the peripheral speed to the number of revolutions at the gear input. The gear wheel prevents the slip on the smaller run radius of the traction mechanism gear. Torque is transferred through the large and small run radius, whereby a larger gear surface is achieved.

According to a second solution for the taut and slip-free guidance of the traction mechanism, the compensation of the deviations of the traction mechanism rotating length from the length theoretically necessary in this condition for the safe transfer of torque, which occur during different adjustment of the two disk arrangements, i.e. uneven adjustment, takes place through pivoting of the disk arrangements around the transfer element. Thereby the shafts connected secured against torsion on the disk arrangements and the elements running on the shafts—output of the first fixed ratio stage and input of the second fixed ratio stage are also pivoted. The pivoting radius is fixed by them. The pivoting thereby always takes place towards, respectively around the transfer element in the circumferential direction.

A further possibility is the allocation of appropriate spring mechanisms to the individual disks of the disk arrangements, whereby the spring mechanisms are for example designed as compression springs and work always in the direction of the smallest run radius.

The design of the gearbox unit with planetary gears with essentially identical dimensioning of the sun wheels and the ring gears and preferably spur wheels and planet wheels in pairs of same size and number of teeth offers in combination with the means for the adjustment of the peripheral speed the advantage that the transfer element can operate over the entire operating range with the traction mechanism, while during different designs of the planetary gears operating ranges occur, in which a synchronous adjustment of the peripheral speed to the number of revolutions of the drive shaft due to the different peripheral speeds at the traction mechanism is not done and the means for adjustment are occasionally deactivated.

BRIEF DESCRIPTION OF THE DRAWING

The invention is following described with the help of the drawing figures. The following is represented in detail:

FIGS. 1a–1c illustrate an embodiment of a gearbox unit according to one form of the invention;

FIG. 2 illustrates a favorable improvement to FIG. 1a;

DETAILED DESCRIPTION

Figure 1A:
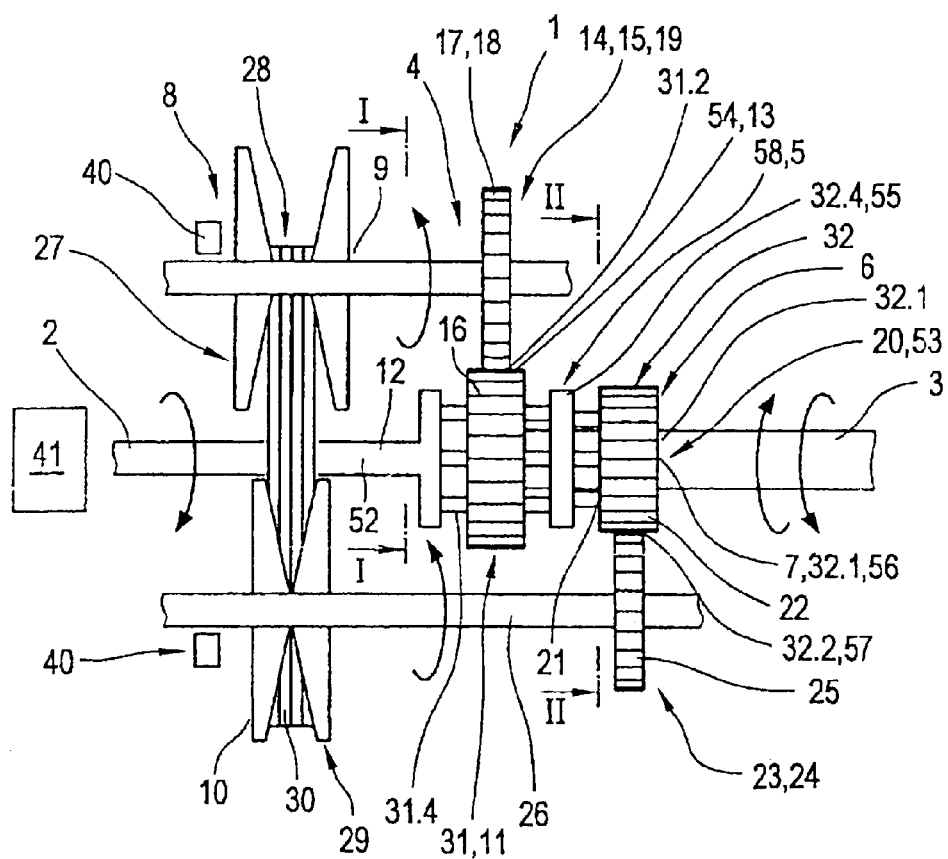

FIG. 1a illustrates in a diagrammatic simplified representation a design of a gearbox unit 1 according to one form of the invention, in particular a superposition gear unit. Gearbox unit 1 comprises a gear input 2 and a gear output 3. The gear input is thereby at least indirectly connected in drive connection secured against torsion with a drive engine here not represented in detail. The output is during use in vehicles at least indirectly secured against torsion coupled with the wheels to be driven, i.e. directly or indirectly through further transfer elements. The gear operates with torque division, comprising a first power branch 4 and a second power branch 5. The second of the two power branches 5 is therefore coupled secured against torsion with the gear output 3. According to the invention an infinitely variable change-speed gear 8 in form of a positively actuated traction mechanism gear 27 is provided in the first power branch 4, whereby the input 9 of the infinitely variable change-speed gear is not directly coupled with the gear input 2 and thus not directly coupled with the drive engine. In particular between the gear input 2 and the input 9 of the infinitely variable change-speed gear 8 no fixed speed ratio is intended. The output 10 of the infinitely variable change-speed gear 8 is not directly coupled with the gear output 3. For this purpose the gear input 2 is coupled with two superposition gears, a first superposition gear 11 and a second superposition gear 6. The two superposition gears—first superposition gear 11 and second superposition gear 6—are designed as three-shaft planetary gears 31 and 32. which are combined into a four-shaft planet wheel gear 58. Each planetary gear—the planetary gear 31 forming the first superposition gear 11 and the planetary gear 32 forming the second superposition gear 6—comprises in each case a first shaft, a second shaft and a third shaft. For the first planetary gear 31 the first shaft is designated with 52, the second shaft with 53 and the third shaft with 54. For the second planetary gear 32 the first shaft is designated with 55, the second shaft with 56 and the third shaft with 57. The shafts 52 to 57 are thereby in each case formed by the elements of the planetary gears 31, 32, in particular the sun wheels 31.1 respectively 32.1 for the planetary gears 31 and 32, the ring gears 31.2 respectively 32.2 and the bars 31.4 and 32.4. Thus in the represented design the two three-shaft superposition gears 11 and 6 are in each case coupled with one another through their sun wheels 31.1 and 32.1 and their bars 31.4 and 32.4. The coupling between the sun wheels 31.1 and 32.1 is connected and secured against torsion with the gear output shaft 3, while the coupling of the bars 31.4 and 32.4 is connected secured against torsion with the gear input shaft 2. The first superposition gear 11 functions during power transfer in the traction operating mode through the traction mechanism gear 27 as a power divider and comprises an input 12, which is connected secured against torsion with the gear input 2 or forms the gear input and is formed by the first shaft 52 and two outputs, a first output 20, which is connected secured against torsion with the gear output shaft 3 and is formed by the second shaft 53 as well as a second output 13, which is coupled through a fixed ratio 14 with the input 9 of the infinitely variable change-speed gear 8 and is formed by the third shaft 54 and thus the ring gear 31.2. The fixed ratio 14 is thereby formed by a fixed ratio stage 15, whereby the input of the fixed ratio stage is formed by the second output 13 of the superposition gear 11 and is designated with 16, while the output 17 is in the represented case formed by a spur wheel 18. The fixed ratio stage 15 is thus formed in the represented case by a spur wheel course 19. The infinitely variable change-speed gears 8 designed as traction mechanism gears 27 is arranged between the two superposition gears 11 and 6, in particular the third shafts 54 and 57. The part coupled with the first superposition gear 11 is thereby the input of the infinitely variable change-speed gear 8 and the part coupled with the second superposition gear 6 is the output.

The first output 20 of the first superposition gear 11, which is formed by the second shaft 53 in form of the sun wheel 31.1 is connected secured against torsion with the gear output 3. Furthermore the gear input shaft 2 is connected with an input 21 of the second superposition gear 6, which is formed by a first shaft 55 in form of the bar 32.4. The inputs and outputs are thereby in each case formed by an element of the superposition gears. During power transfer at the gear output 3 a second output 22 of the second superposition gear 6 is coupled with the output 10 of the infinitely variable change-speed gear 8 through a fixed ratio stage 23, whereby this is formed in the represented case by a spur wheel course 24 and a first spur wheel 25 is connected secured against torsion with the first output 10 of the infinitely variable change-speed gear 8, which lies in the power direction of the first to the second disk arrangement. This coupling secured against torsion takes place via the arrangement of the output 10 and the first spur wheel 25 on a joint connecting shaft 26. The output 7 formed by the second shaft 56 of the second superposition gear 6 in form of the sun wheel 32.1 is furthermore connected secured against torsion with the output 20 of the first superposition gear 11, preferably through a direct coupling.

A multiplicity of possibilities exists concerning the design of the infinitely variable change-speed gear 8. The represented design comprises a positively actuated traction mechanism gear 27, whereby the input 9 is formed by a first disk arrangement 28 and the output 10 is formed by a second disk arrangement 29. The distance of the disks can be adjusted variably. The coupling of the two disk arrangements and the power transfer take place through a traction mechanism 30, for example in form of a belt, a chain or steel thrust belt.

The first superposition gear 11 and the second superposition gear 6 are, as already described, designed as rotating gears in the form of planet wheel gears 31 respectively 32. These comprise in each case, as represented in FIG. 1b for the planetary gear 31, at least a sun wheel 31.1, a ring gear 31.2, a bar 31.4, which couples the planet wheels 31.3 with one another. In the second planetary gear 32 according to the invention the sun wheel 32.1 and the ring gear 32.2 are however connected by planet wheels 32.31, 32.32 meshing in pairs with one another, whereby the sun wheels 32.1 and 31.2 and the ring gears 31.2, 32.2 of the two planet wheel sets 31, 32 are in each case equally dimensioned. The dimensioning refers thereby to the external dimensions, in particular the outer diameter and the number of teeth of the individual wheels. According to the invention furthermore the two ratio stages 15 and 23 are equally dimensioned. The input of the first superposition gear 11, which is marked with 12, is thereby formed by the bar 31.4. Said bar is directly coupled with the input 21 of the second superposition gear 6, which functions at least in the functional state of the power transfer through the infinitely variable change-speed gear 8 as summing gear, respectively forms said input. Said input is also formed by the bar 32.4 of the second planetary gear 32. This means that the bars of both planetary gears are connected secured against torsion with one another. Furthermore the two outputs 20 and 7 of the first superposition gear 11, i.e. planetary gears 31 and second superposition gear 6, i.e. planetary gear 32, are formed in each case by the sun wheel 31.1 respectively 32.1, which are connected secured against torsion with the gear output. The ring gear 31.2 of the planetary gear 31, i.e. the first superposition gear 11 forms thereby the input 16 of the fixed ratio, while the ring gear 32.2 forms the output of the fixed ratio stage 23.

FIG. 1a and the views I—I and II—II according to FIG. 1b, illustrate a particularly favorable embodiment of the two superposition gears 11 and 6. With this design the first superposition gear 11 comprises for example a ring gear 31.2, a sun wheel 31.1, a bar 31.4 and simple planet wheel arrangements in the form of planet wheels 31.3 meshing in each case with sun wheel 31.1 and ring gear 31.2. Between sun wheel 31.1 and ring gear 31.2 a multiplicity of individual planet wheels 31.3 are present, i.e. each of the planet wheels 31.3 mesh both with the sun wheel 31.1 and the ring gear 31.2. The second superposition gear 6 is designed as planetary gear 32 with planet wheels 32.31 and 32.32 meshing in pairs with one another and which are preferably likewise equally dimensioned regarding size, in particular outside diameter and gearing, in particular number of teeth. Both ring gears 31.2 respectively 32.2 and both sun wheels 31.1 respectively 32.1 are according to one form of the invention equally dimensioned regarding size and number of teeth, preferably both are characterized by an equal reference diameter and an equal number of teeth, i.e. with the sun wheels at the outer circumference of these and with the ring gears 31.2; 32.2 in each case both at the interior circumference and at the outer circumference as well as the same module m. Both sun wheels 31.1 and 32.1 can thereby be designed for example with a diameter that is within the range of including 2 to including 2.6 times smaller than the interior circumference of the ring gear 31.2 respectively 32.2 and which exhibit also a number of teeth which is accordingly to 2 to 2.6 times smaller.

A design of the first superposition gear 11 similar to the second superposition gears 6 described in FIG. 1b is also conceivable with appropriate dimensioning of the ratio stages, i.e. with planet wheels between sun wheel and ring gear meshing in pairs with one another, while the second superposition gear 6 then has only individual planet wheels 32.3 meshing directly with the sun wheel 32.1 and the ring gear 32.2, as represented in FIG. 1c.

The mode of operation is as follows: In a first operating range the number of revolutions at the gear output 3 equals zero for a driven gear input shaft, i.e. gear input 2. The power is therefore basically transferred from the gear input shaft over both superposition gears to both disk arrangements 28, 29 of the infinitely variable change-speed gear 8. This runs basically idle. The ratio at the disk arrangements 28, 29 is selected in such a manner in this condition that the disk arrangement 28, which is coupled with the first superposition gear 11, rotates more slowly than the second disk arrangement 29, which is coupled with the second superposition gear 6, i.e. a ratio into the fast would be ensured. Then a change of the speed ratio at the infinitely variable change-speed gear 8 takes place toward ratio into the slow regarded during power transfer from the first to the second disk arrangement 28, 29 (changes of the disks in the number of revolutions). The output shaft, i.e. the gear output shaft 3, is driven. With increasing number of revolutions (revolution speed) at the drift this affects also the number of revolutions of the ring gear 31.2 at the first superposition gear 11 and the input 9 of the infinitely variable change-speed gear 8 and therefore also within the range of the output 10 of the infinitely variable change-speed gear 8.

A substantial advantage of the solution according to the invention is that by means of the superposition gears 11 respectively 6 and the possibility of the active control of the traction mechanism gear 8, for example through means 40, the load of the traction mechanism gear can be kept small, in this case by being able to actively change the ratio at the traction mechanism gear 8 through control of the disk arrangements 28 respectively 29 and thus being able to keep the input small at high numbers of revolutions at the traction mechanism gear. Due to the design of one of the superposition gears designed as planetary gears with planet wheels meshing in pairs with one another, which are also called double-rotor planetary gears, it is guaranteed in each operating state that the CVT operates at the maximum engine speed with a constant (sum of both third shafts) number of revolutions, whereby also a change regarding the speed ratio at the individual disks at maximum engine speed can take place, i.e. turning over zero is possible. The third shaft of the first superposition gear and the third shaft of the second superposition gear change the number of revolutions, e.g. from 4800 to 2000 rpm, from 2000 to 4800 rpm. Furthermore this design offers besides the functional advantages also advantages regarding the necessary space, as the individual superposition gears and ratio stages are not different from each other in radial direction regarding the necessary space.

Furthermore FIG. 1*a* illustrates the possibility of the arrangement of the gearbox unit 1 with a starting element 41, for example a hydrodynamic variable speed gear/torque converter. Other starting elements are also possible.

The designs shown in FIGS. 1*a* to 1*c* represent a solution, which can be designed particularly simply and compact. The control of the infinitely variable change-speed gear unit takes thereby place as a function of the value of the engine speed as well as the desired torque, respectively the number of revolutions, which can be transferred from the drift. Furthermore also the torque at the gear output 3 can be used as an additional influencing variable.

FIG. 2 illustrates a particularly favorable improvement of the gearbox unit 1 according to the invention on the basis of a design according to FIG. 1*a*, however with a reversed arrangement of the disk arrangements 28, 29 for transmitting high torques. The basic structure corresponds thereby to the one described in FIG. 1*a*, and the same reference symbols are used for the same elements. The infinitely variable change-speed gear 8 is likewise designed as a positively actuated traction mechanism gear 27, whereby a first disk arrangement 28 forms the input 9 and a second disk arrangement 29 forms the output 10, whereby the disks can be moved towards each other and away from each other, i.e. the distance is variable. The coupling of the two disk arrangements and the power transfer take place through a traction mechanism 30, for example in form of a belt, a chain or steel thrust belt. According to the invention the traction mechanism 30 is provided with a profiling 44 at the outer circumference 43, which permits meshing of a transfer element 42, coupled at least indirectly secured against torsion with the gear input 2, with a profiling 45 which is designed complementary to the profiling 44 and makes possible thus a synchronous adjustment of the peripheral speed of the traction mechanism 30 to the gear input 2 at any speed ratio between gear input and gear output 2 and 3. This arrangement offers the advantage that with the same dimensioning of the traction mechanism gear 27 a multiple of the power, for example approx. 3 times more power, can be transferred than without this arrangement. Slip conditions at the traction mechanism gear 27 are avoided. Gears or chain wheels are used as transfer element 42 according to the selection of the traction mechanism 30. The length changes are offset through a tensioning device, for example a tightening roller 47. The gear wheel prevents slip on the small run radius of the CVT. Both disk arrangements transfer torques (large and small run radius).

Figure 3:
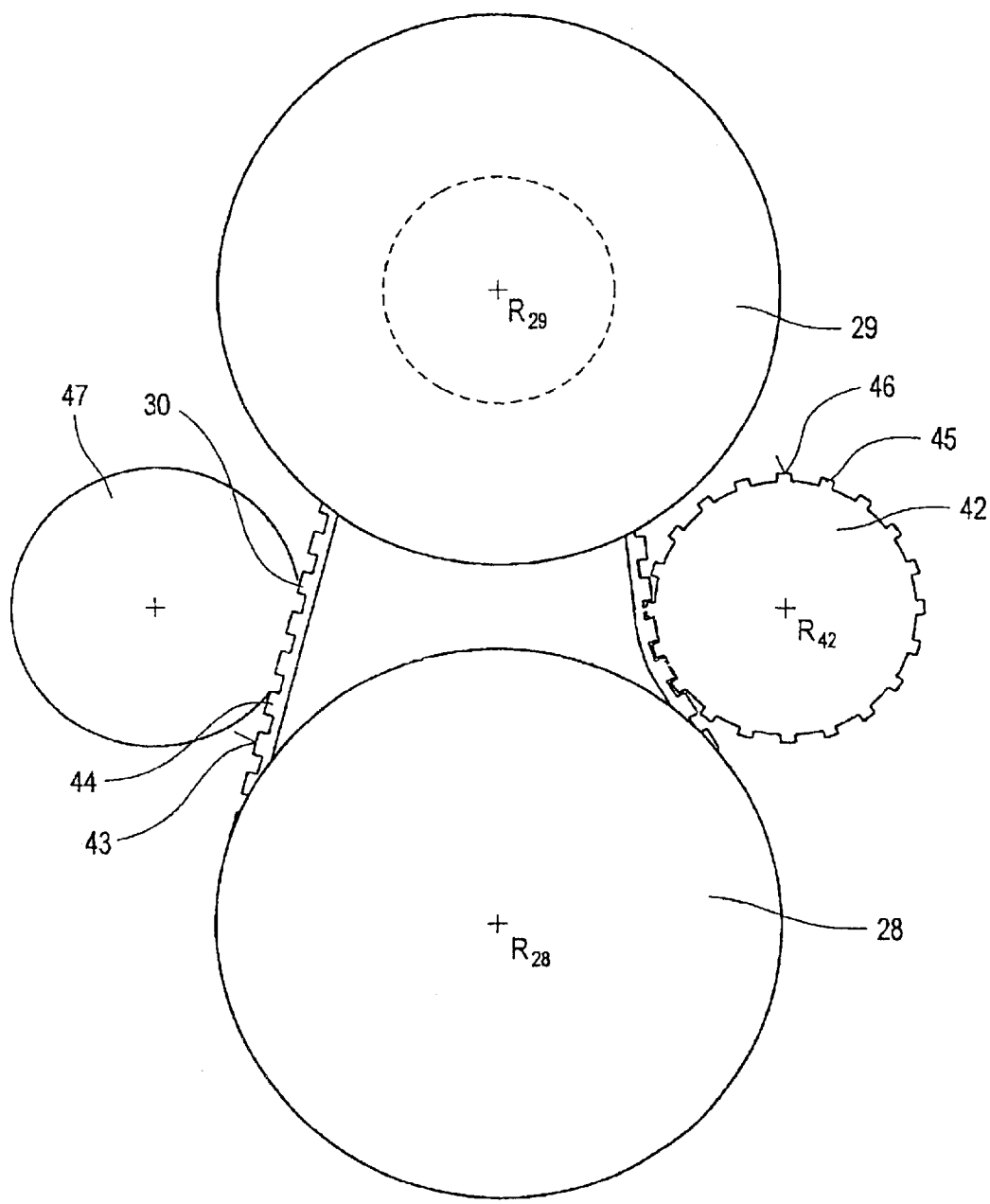
FIG. 3 illustrates a view in direction A according to FIG. 2 onto the disk arrangements.

FIG. 3 illustrates in a diagrammatic simplified representation a view A in FIG. 2 onto the traction mechanism gear 30, which is arranged in a plane parallel to the drive shaft 2. From this view it is evident that the traction mechanism 30 has at the outer circumference 43 for example profilings 44. Said profiling can be worked into the traction mechanism 30 or can be formed through an appropriate arrangement, for example making the traction mechanism 30 of several layers. The traction mechanism 30 is preferably designed as toothed belt. The transfer element 42 is designed as gear wheel and has at its outer circumference 46 an accordingly complementary profiling 45, which makes it possible to mesh with the traction mechanism 30 and to work with it positively actuated. A design as a chain is however also conceivable. In this case the transfer element 42 is then designed as a chain wheel.

The transfer element 42 is connected secured against torsion with the gear input 2 functioning as the drive shaft and makes possible in connection with a tensioning device a synchronous adjustment of the peripheral speed of the traction mechanism 30 to the number of revolutions of the drive engine respectively the gear input 2. Slippage of the traction mechanism is thereby avoided. Conceivable however are also designs of the means for the coupling of the peripheral speed to the number of revolutions of the drive shaft with a multiplicity of transfer elements meshing with one another, whereby an odd number is to be selected, in order to ensure the uniformity of the direction of rotation between gear input 2 and direction of travel of the traction mechanism 30. The meshing thereby takes place always sequentially. The transfer elements can also be designed as swiveling. They then serve at the same time as tensioning devices for the adjustment of the peripheral speed of the traction mechanism to the gear.

Figure 4:
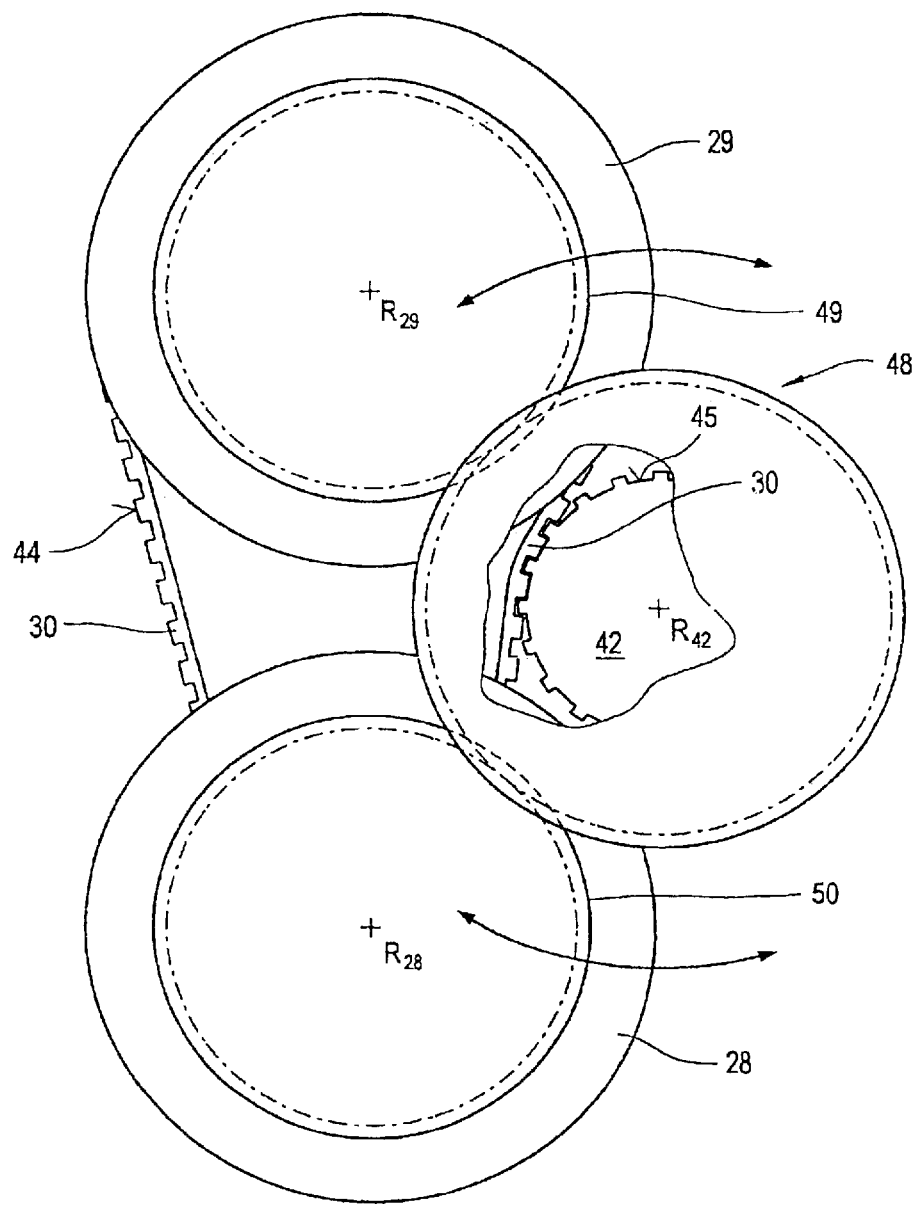
FIG. 4 illustrates in a diagrammatic simplified representation by means of a view in direction A according to FIG. 2 an alternative design of the means for the adjustment of the peripheral speed at the traction mechanism to the number of revolutions at the gear input.

FIG. 4 illustrates in a view A according to FIG. 2 a further design possibility for the realization of the tension at the traction mechanism 30 and the adjustment of the peripheral speed of the traction mechanism 30 to the number of revolutions of the transfer element 42. The traction mechanism 30 is likewise provided with a profiling 44, which meshes with a profiling 45 at the transfer element 42 complementary to the profiling 44. The transfer element 42 is connected secured against torsion with the drive shaft, respectively the gear input 2, and makes the possible synchronous adjustment of the peripheral speed of the traction mechanism 30 to the number of revolutions of the drive shaft, respectively the gear input 2. For the realization of the tension at the traction mechanism 30, necessary for the power transfer, during adjustment of at least one of the disk arrangements 29 and 28 or of both they are swiveled in the direction of rotation. The swiveling takes place related to the rotation axis $R_{42}$ of the transfer element 42 on a radius that is determined by the distance between rotation axis $R_{42}$ and the rotation axes $R_{28}$, $R_{29}$ of the individual disk arrangements 28, 29 to accomplish this. A swiveling gear 48 is provided, which is designed as a spur wheel stage and comprises two spur wheels 49 and 50 coaxially arranged to the disk arrangements 28 and 29, which mesh with a spur wheel 51 that is coaxially arranged to the transfer element 42. The spur wheel 51 is carried stationary regarding its rotation axle. The adjustment, respectively the swiveling, takes place preferably synchronously to the offset for the adjustment of the distances at the individual disk arrangements 28, 29. Thus the distances between the rotation axes $R_{28}$, $R_{29}$ are changed in radial direction.

REFERENCE SYMBOL LIST

1 Gearbox unit
2 Gear input
3 Gear output
4 First power branch
5 Second power branch
6 Second superposition gear
7 Output of the second superposition gear
8 Infinitely variable change-speed gear
9 Input of the infinitely variable change-speed gear
10 Output of the infinitely variable change-speed gear
11 First superposition gear
12 Input of the first superposition gear
13 First output of the first superposition gear
14 Fixed ratio
15 Fixed ratio stage
16 Input of the fixed ratio stage
17 Output of the fixed ratio stage
18 Spur wheel
19 Spur wheel course
20 Second output
21 Input of the second superposition gear
22 Second input of the second superposition gear
23 Fixed ratio stage
24 Spur wheel course
25 First spur wheel
26 Spacer shaft
27 Positively actuated traction mechanism gear
28 Disk arrangement
29 Disk arrangement
30 Traction mechanism
31 Planetary gear
32 Planetary gear
31.1, 32.1 Sun wheel
31.2, 32.2 Ring gear
31.3, 32.3,
31.31, 31.32 Planet wheels 31.34, 32.4 Bar
40 Means for influencing the speed ratios at the infinitely variable change-speed gear
41 Starting element
42 Transfer element
43 Outer circumference
44 Profiling
45 Profiling
46 Outer circumference
47 Tensioning device
48 Adjustable mechanism
49 Spur wheel
50 Spur wheel
51 Planetary gear
52 First shaft of the first superposition gear 11
53 Second shaft of the first superposition gear 11
54 Third shaft of the first superposition gear 11
55 First shaft of the second superposition gear 6
56 Second shaft of the second superposition gear 6
57 Third shaft of the second superposition gear 6
58 Four-shaft planet wheel gear

What is claimed is:

1. A gearbox unit, comprising:
   a gear input and a gear output;
   first and second superposition gears which are designed as three-shaft planetary gears, comprising in each case a sun wheel, a ring gear, a bar and planet wheels, wherein the individual shafts are formed in each case by the sun wheels, the ring gears and the bars or the elements which are connected with them secured against torsion—the first superposition gear and the second superposition gear, which are coupled with one another to a four-shaft planetary gear;
   a first shaft of the first superposition gear and a first shaft of the second superposition gear is connected secured against torsion with the gear input;
   a second shaft of the first superposition gear and a second shaft of the second superposition gear is connected secured against torsion with the gear output;
   an infinitely variable change-speed gear in the form of a traction mechanism gear arranged between third shafts of the first and second superposition gear;
   means for controlling the speed ratio at the traction mechanism gear;
   one of the two superposition gears—first superposition gear or second superposition gear—comprising in each case first and second planet wheels meshing in pairs with one another, wherein the first of the planet wheels meshing in pairs with one another meshes in each case directly with the ring gear and the second planet wheel, and in each case the second of the planet wheels meshes with the first planet wheel and the sun wheel,
   the other one of the two superposition gears having individual planet wheels between the respective sun wheel and ring gear.

2. The gearbox unit according to claim 1, wherein the sun wheels and the ring gears of both superposition gears are dimensioned equally.

3. The gearbox unit according to claim 2, wherein the sun wheels and the ring gears of both superposition gears are in each case dimensioned equally regarding their external dimensions in radial direction and gearing.

4. The gearbox unit according to claim 3, wherein:
   the sun wheels of both superposition gears are characterized by an equal reference diameter and an equal number of teeth or an equal module;
   the ring gears of both superposition gears are characterized at the outer diameter and the inner diameter in each case by an equal reference diameter and an equal number of teeth or an equal module.

5. The gearbox unit according to claim 1, wherein:
   the first shaft of the first superposition gear and the first shaft of the second superposition gear are formed in each case by the bar or an element of the individual planetary gears which is coupled with said bar secured against torsion;
   the second shaft of the first superposition gear and the second shaft of the second superposition gear are formed in each case by the sun wheels of the respective planetary gears;
   the third shafts of the first and second superposition gears are formed by the ring gears of the planetary gears.

6. The gearbox unit according to claim 1, wherein:
the third shaft of the first superposition gear is coupled over a ratio stage with the infinitely variable change-speed gear.

7. The gearbox unit according to claim 1, wherein:
the third shaft of the second superposition gear is coupled over a ratio stage with the infinitely variable change-speed gear.

8. The gearbox unit according to claim 6, wherein fixed ratio stages are formed by spur wheel stages.

9. The gearbox unit according to claim 8, wherein:
a first fixed ratio stage is formed by the third shaft of the first superposition gear and a spur wheel which is coupled secured against torsion with an input of the infinitely variable change-speed gear;
a second fixed ratio stage is formed by a spur wheel which is coupled secured against torsion with an output of the infinitely variable change-speed gear and the third shaft of the second superposition gear.

10. The gearbox unit according to claim 9, wherein the two fixed ratio stages are dimensioned equally.

11. The gearbox unit according to claim 1, wherein the first superposition gear and the second superposition gear are laid out in such a manner regarding their dimensioning that between the third shaft of the first superposition gear and the third shaft of the second superposition gear a ratio between 1 to 2 to 3 can be adjusted.

12. The gearbox unit according to claim 1, wherein the infinitely variable change-speed gear is a positively actuated traction mechanism gear and a steel thrust belt or a belt or a chain are used as the traction mechanism.

13. The gearbox unit according to claim 1, including means for the adjustment of the peripheral speed of the traction mechanism to the number of revolutions of the gear input.

14. The gearbox unit according to claim 13, wherein the means for the adjustment of the peripheral speed of the traction mechanism to the number of revolutions of the gear input comprise a transfer element which is coupled at least indirectly with the gear input and can be brought into positively actuated connection with the traction mechanism.

15. The gearbox unit according to claim 14, wherein the traction mechanism is designed at the outer circumference thereof with a rotating profiling, which can be brought into mesh with a profiling at the outer circumference of the transfer element which is designed complementary to it.

16. The gearbox unit according to claim 15, wherein the transfer element is arranged coaxially to the gear input and is secured against torsion with said gear input or parallel to said gear input and a swiveling gear for swiveling disk arrangements around the transfer element is provided for maintaining the tension at the traction mechanism.

17. The gearbox unit according to claim 15, wherein the transfer element is arranged coaxially to the gear input and is secured against torsion with said gear input or parallel to said gear input and a tensioning device which runs on bearings and can be adjusted or swiveled is assigned to the traction mechanism for maintaining tension.

18. The gearbox unit according to claim 1, wherein the means for controlling the speed ratio at the traction mechanism gear comprises actuators for adjusting the distances of individual disk arrangements.

19. The gearbox unit according to claim 1, wherein means for the realization of reversing the direction of rotation are provided.

20. The gearbox unit according to claim 19, wherein the means for the realization of reversing comprises a reversing switch set.

21. The gearbox unit according to claim 1, including a starting element that superposes the gear input.

22. A gearbox unit according to claim 21, wherein the starting element is designed as a hydrodynamic variable speed gear/torque converter or hydrodynamic clutch.

23. A gearbox unit according to claim 21, including a bypass clutch assigned to the starting element.

24. A gearbox unit according to claim 21, wherein the starting element is designed as a multiple disk clutch.

25. A gearbox unit according to claim 21, wherein the starting element is designed as a mechanical clutch.

26. The gearbox unit of claim 11, wherein said ratio is 1 to 2.4.

* * * * *